United States Patent [19]

Fischer et al.

[11] 3,858,545

[45] Jan. 7, 1975

[54] ICING DEPOSITOR

[75] Inventors: Harry A. Fischer, Frankenmuth; Kenneth Dietzel, Saginaw; Vern V. Cronk, Hemlock; Dale E. Stimpson, Freeland, all of Mich.

[73] Assignee: Baker Perkins Inc., Saginaw, Mich.

[22] Filed: Apr. 8, 1974

[21] Appl. No.: 458,987

[52] U.S. Cl. .................. 118/13, 99/450.7, 118/17, 118/257, 118/261
[51] Int. Cl. ............................................. A23g 3/20
[58] Field of Search .......... 118/13, 17, 70, 100, 203, 118/239, 257, 261, 602; 99/450.7

[56] References Cited
UNITED STATES PATENTS

| | | | |
|---|---|---|---|
| 1,153,585 | 9/1915 | Vicars et al. | 118/13 |
| 2,182,068 | 12/1939 | Clark | 118/13 |
| 3,137,591 | 6/1964 | Schoutissen | 118/13 |
| 3,710,754 | 1/1973 | Pond | 118/13 |

*Primary Examiner*—Mervin Stein
*Assistant Examiner*—Douglas A. Salser
*Attorney, Agent, or Firm*—Learman & McCulloch

[57] ABSTRACT

An icing depositor for depositing a layer of icing upon cookies and like food products moving along a conveyor. An endless belt conveyor is supported about the cookie conveyor with a horizontal lower run of the belt closely spaced above the first conveyor and driven in the same direction and at the same speed as the cookie conveyor. An open bottomed icing hopper is supported above the upper run of the belt to deposit a layer of icing of selected thickness upon the belt as it passes beneath the hopper opening. As the icing passes along the lower run of the belt it is pressed against and maintained in contact with cookies on the first conveyor. Unused icing, returned by the belt to the hopper, is scraped from the belt by a blade located in the hopper opening, the scraped icing passing into the hopper and becoming mixed with fresh icing.

5 Claims, 3 Drawing Figures

ICING DEPOSITOR

BACKGROUND OF THE INVENTION

The present invention is especially directed to a machine for applying icing to baked products, such as cookies, immediately after baking in a commercial baking operation. The usual form of machine employed for this purpose takes the form of an icing applying roller. An icing dispensing hopper is mounted above the roller to continuously apply a layer of icing of desired thickness to the roller surface as it rotates beneath the hopper and icing is transferred from the roller to cookies conveyed beneath the roller in contact with the icing layer. A typical example of a roller depositor just described is found in Clark Pat. No. 2,182,068.

A primary problem with roller-type icing depositors is the fact that the cylindrical roller provides for only a generally line-type contact with the product to which the icing is to be applied and thus a given point of contact between the cookie and icing layer is maintained for only a relatively short period of time. The period of contact at any given point is so short as to generally limit the amount of icing deposited, because the cookie has no time to absorb or become firmly adhered to the icing. Further, most icings tend to harden upon exposure to air and undeposited icing adhering to the roll gradually forms a layer of hardened icing on the roll over a period of time.

The present invention is directed to the provision of an icing depositor in which an adequate time of face-to-face contact between the icing and cookie is maintained to secure adequate adsorption of icing by the cookie and adherence of the icing to the cookie. The present invention further prevents build-up of a hardened layer of icing upon the coating mechanism.

SUMMARY OF THE INVENTION

In accordance with the present invention, the icing depositor takes the form of an endless belt having a lower run spaced above and driven at the same speed in the same direction as is an opposed belt of a cookie conveyor. The lower run of the belt passes beneath a flat pressure plate which assures that the layer of icing carried by the belt is pressed firmly onto cookies conveyed on the opposed cookie conveyor. An open bottomed icing hopper overlies the upper run of the belt to continuously deposit a layer of icing of uniform thickness upon the belt as it passes beneath the hopper. To prevent build-up of icing on the belt, a scraper is mounted in the hopper opening to extend entirely across the upper run of the belt to scrape icing returned to the hopper from the belt into the hopper where the scraped icing is mixed in with fresh icing in the hopper.

Other objects and features of the invention will become apparent by reference to the following specification and to the drawings.

IN THE DRAWINGS

Figure 1:
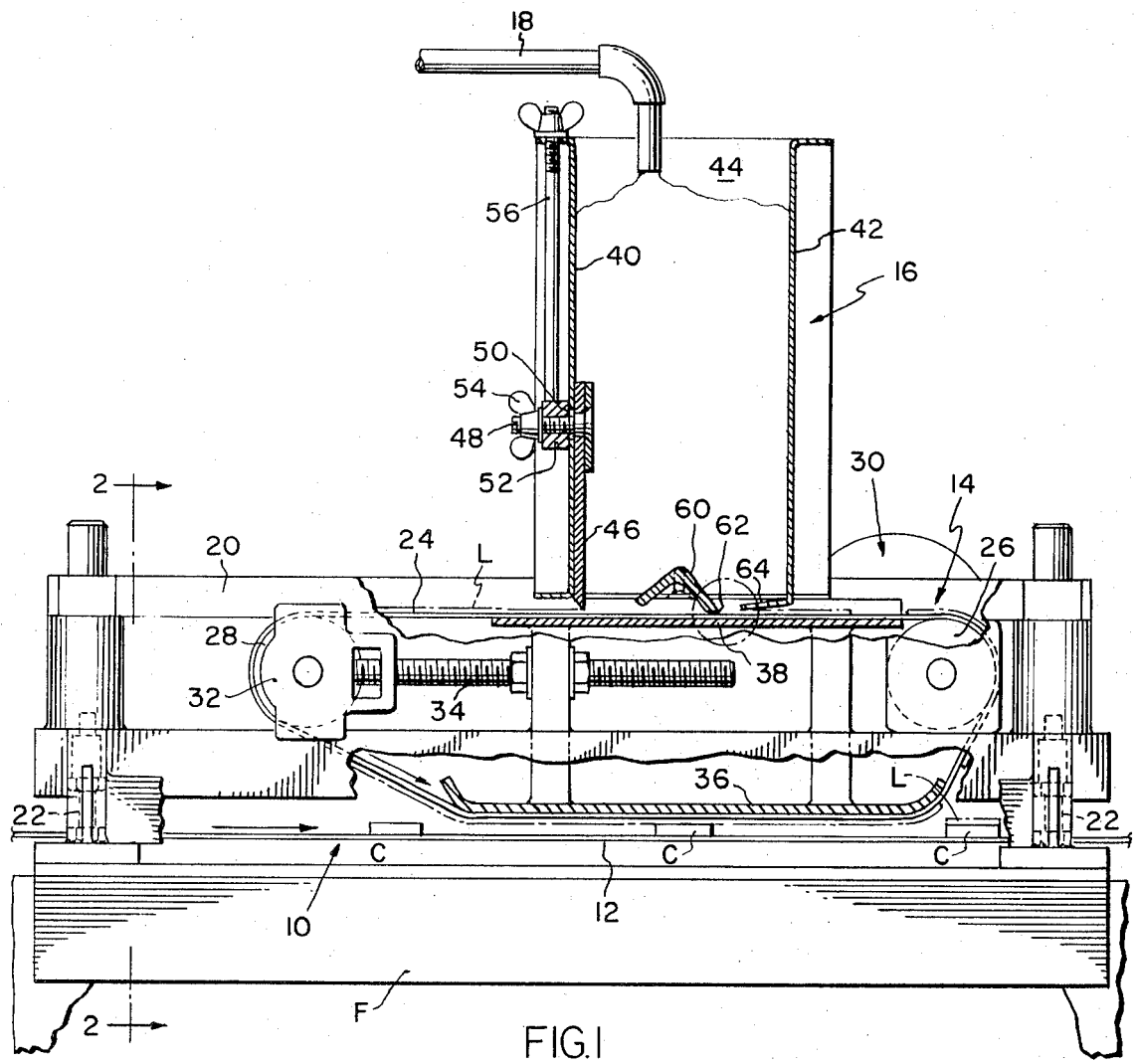
FIG. 1 is a side elevational view, with certain parts broken away or shown in cross section, of an icing depositor embodying the present invention.
Figure 1A:
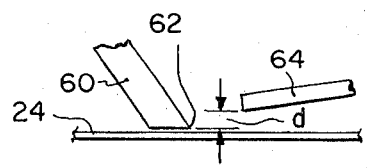
FIG. 1A is an enlarged view of the area circled in FIG. 1.
Figure 2:
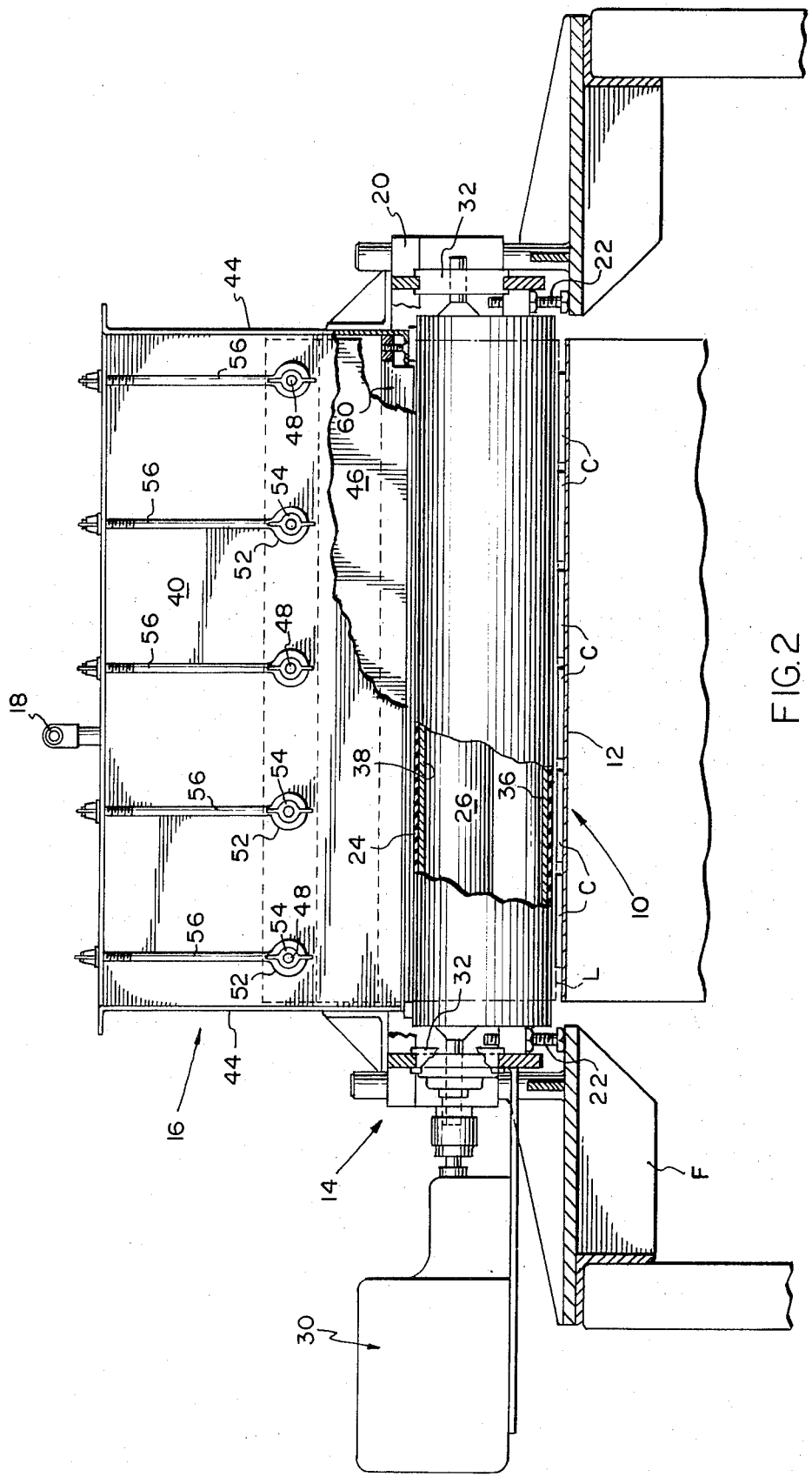
FIG. 2 is a cross sectional view of the apparatus of FIG. 1, with certain parts broken away, taken on the line 2—2 of FIG. 1.

In the application drawings, a portion of a cookie conveyor designated generally 10 is shown and includes an endless belt 12 which is driven in a conventional manner to convey rows of cookies C (see FIG. 2) from left to right as viewed in the side elevational view, FIG. 1.

An icing depositor embodying the present invention is supported upon a stationary frame F and includes an endless belt conveyor designated generally 14 and an icing hopper designated generally 16 to which icing is supplied from a suitable source, such as a supply pipe 18. Conveyor 14 and hopper 16 are both supported upon a common framework 20 which is capable of being vertically adjusted relative to stationary framework F as by jack screws 22.

Conveyor 14 includes an endless belt 24 operatively trained around a pair of end rolls 26 and 28, end roll 26 being a drive roll driven by a suitable drive system designated generally 30. End roll 28 is an idler roll and is rotatably supported between a pair of brackets 32 (FIG. 1) which can be horizontally positioned as by an adjustment screw 34 to regulate the tension in belt 24. The lower run of belt 24 is slidably engaged by a flat pressure plate 36, plate 36 being mounted upon frame 20. A flat support plate 38 is likewise supported from frame 20 to underlie that portion of the belt beneath hopper 16 to prevent this portion of the belt from being bulged downwardly by the weight of icing contained in hopper 16.

Drive 30 is operable to drive belt 24 in a counterclockwise direction as viewed in FIG. 1 so that the lower run of the belt slides beneath pressure plate 36 at the same speed and in the same direction as does the belt 12 of cookie conveyor 10. Frame 20 is vertically adjusted by screws 22 on stationary frame F to locate that portion of belt 24 beneath pressure plate 36 at a spacing above belt 12 of the cookie conveyor 10 which is approximately equal to the thickness of cookies C on belt 12 plus the desired thickness of the layer of icing to be deposited on the cookies.

Hopper 16 takes the form of a generally rectangular housing, open at its top and bottom, and having a front side wall 40, a rear side wall 42 and end walls 44. A vertically adjustable gate plate 46 is mounted on the inner side of the front wall 40 and projects downwardly below the lower edge of the front wall 40 to a selected position of adjustment above the upper run of the belt 24 to thereby determine the thickness of the layer of icing carried from hopper 16 by belt 24. Clamp screws 48 fixed to plate 46 project through vertically elongate openings 50 in front wall 40 and through a bore in an adjusting block 52 at the outer side of front wall 40. A wing nut 54 threaded onto screw 48 is employed to clamp the plate at its selected position of vertical adjustment. Adjustment blocks 52 are fixedly mounted on the end of a vertical adjustment screw 56. The range of vertical adjustment of the plate 46 need not be very great, one quarter of an inch being adequate for most operations. The vertical elongation of openings 50 accommodates this range of movement, the adjusting block 52 overlying opening 50 throughout the range of adjustment and thus sealing opening 50 to prevent leakage of icing.

A scraper blade 60, which is of a configuration so that it remains rigid, is mounted within and extends centrally across the open bottom of hopper 16 in a direction normal to the path of movement of belt 24. The rearward edge 62 of scraper 60 is located in sliding contact with the surface of belt 24 and scrapes icing L from the belt surface, the scraped icing passing upwardly along the inclined surface of scraper 60 into the interior of hopper 16 through the relatively narrow opening between scraper 60 and a forwardly projecting flange 64 at the lower edge of rear wall 42. It will be noted that the edge 62 of blade 60 is disposed a predetermined distance $d$ below the lower surface of member 64. The relatively narrow opening between scraper 60 and the forward edge of flange 64 is adequate to permit icing scraped from belt 24 to move upwardly into hopper 16 while at the same time restricting the flow of icing already contained in hopper 16 from moving outwardly through the opening between scraper 60 and flange 64.

Operation of the apparatus is as follows. Jack screws 22 are adjusted to locate the lower run of belt 24 at a distance above belt 12 corresponding approximately to the combined thickness of cookies C on conveyor 12 and the thickness of the layer of icing to be deposited on the cookies. Drive 30 is energized and adjusted to drive belt 24 in a counterclockwise direction as viewed in FIG. 1 so that the lower run of belt 24 moves in the same direction and at the same speed as does belt 12. Gate plate 46 is adjusted to a distance above the upper run of belt 24 corresponding to a desired icing layer thickness L. Icing flows from hopper 16 onto belt 24 through the opening between the forward edge of scraper 60 and gate plate 46, the gate plate regulating the thickness of the layer of icing on belt 24 carried out of hopper 16.

Cookies advancing along conveyor 12 move into contact with the layer of icing on belt 24 as the cookies pass beneath the left-hand edge of pressure plate 36 as viewed in FIG. 1. The layer of icing on the belt is pressed downwardly against the cookie and the cookie and layer of icing remain in direct contact with each other throughout the passage of the cookie under pressure plate 36. The cookies are normally iced immediately after their exit from the baking oven and the heat of the cookie, combined with the substantial time interval of direct contact with icing on the belt assures adequate absorption and adhesion of the icing to the cookie.

Because the cookies are spaced as indicated in FIG. 1, a substantial amount of icing on belt 24 does not come into contact with the cookie and unused icing carried by the belt back to hopper 16 is scraped from the belt by the leading edge of scraper 60, the unused icing thus passing back into hopper 16 to become mixed and recirculated within the icing already in the hopper. By continuously scraping unused icing from the belt in this manner, the build-up of a hardened layer of icing on the belt is prevented.

While one embodiment of the invention has been described in detail, it will be apparent to those skilled in the art that the disclosed embodiment may be modified. Therefore, the foregoing description is to be considered exemplary rather than limited, and the true scope of the invention is that defined in the following claims.

What is claimed is:

1. An icing depositor for depositing a layer of icing upon cookies moving along a first conveyor comprising a second conveyor including an endless belt, an upper run and a lower run, support means mounting said second conveyor above said first conveyor with said lower run of said belt extending in parallel overlying relationship to said first conveyor and spaced above said first conveyor by a distance approximating the thickness of a cookie with a layer of icing, drive means for driving the belt of said second belt conveyor to move said lower run at the same speed in the same direction as the opposed portion of said first conveyor, an icing hopper mounted on said support means in spaced overlying relationship with said upper run and having an opening in the bottom thereof for depositing a layer of icing on said upper run of said belt, said belt conveying icing deposited thereon into contact with cookies on said first conveyor as the icing passes along said lower run, and blade means extending across said opening normal to the direction of movement of said upper run of said belt for scraping unused icing returned by said belt from said lower run into the interior of said hopper.

2. The invention defined in claim 1 wherein said second conveyor further comprises a flat pressure plate overlying and in slidable engagement with the lower run of said belt for pressing icing on said lower run of said belt onto cookies carried therebeneath on said first conveyor.

3. The invention defined in claim 1 wherein said opening in said hopper is of generally rectangular configuration extending substantially across the width of said belt, said blade means comprising a web member extending across the entire width of said opening and inclined upwardly and forwardly with respect to the direction of movement of said upper run of said belt, and forwardly projecting flange means on said hopper extending the entire length of the rear side of said opening, the forward edge of said flange means being spaced rearwardly from said blade means and a predetermined distance above it to define a relatively narrow opening rearwardly of said blade to accommodate movement of the scraped filling into said hopper while inhibiting outflow therefrom, the forward edge of said blade means being spaced rearwardly from the front side of said opening to define a relatively wide opening for discharging icing from said hopper.

4. The invention defined in claim 3 further comprising means at the front side of said opening for adjustably establishing the thickness of the layer of icing deposited on said belt by said hopper.

5. The invention defined in claim 1 further comprising means for vertically adjusting said support means relative to said first conveyor.

* * * * *